(No Model.)　　　　　　　　　　　　　　　　2 Sheets—Sheet 1.
J. D. CURTIS.
MACHINE FOR MAKING BARBED FENCING.
No. 340,939.　　　　　　　　　　Patented Apr. 27, 1886.
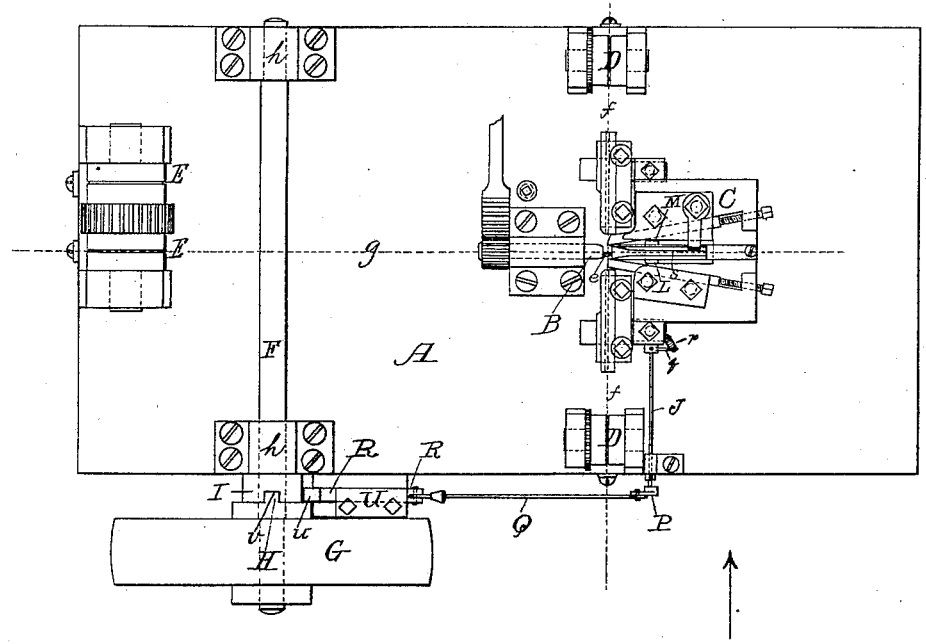
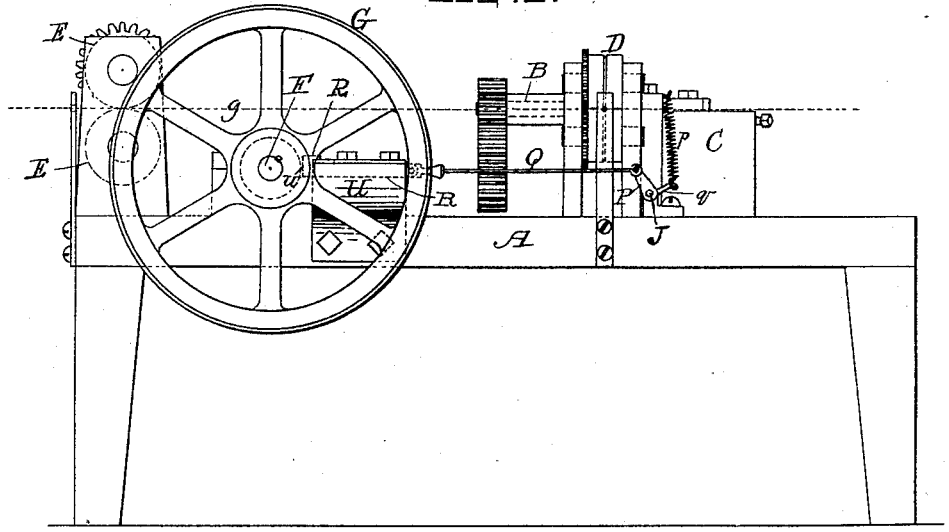
Witnesses:　　　　　　Inventor:
Joseph A. Toupin　　　John D. Curtis,
Fred W. Smith　　　　By John C. Dewey Att'y.

(No Model.) 2 Sheets—Sheet 2.
J. D. CURTIS.
MACHINE FOR MAKING BARBED FENCING.
No. 340,939. Patented Apr. 27, 1886.
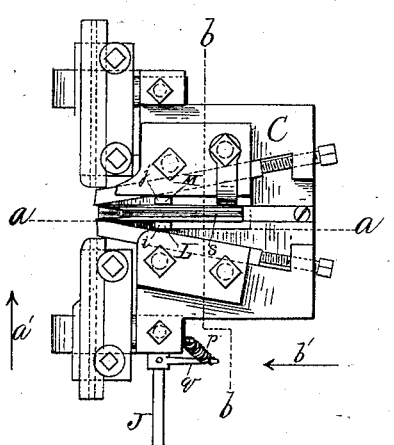
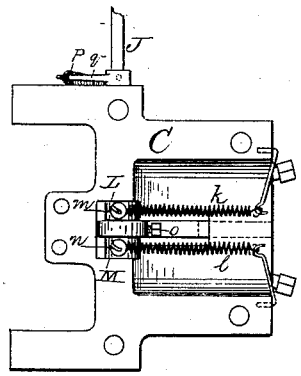
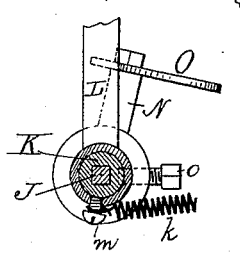
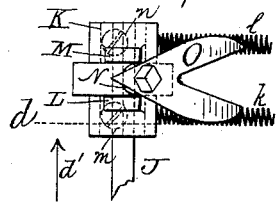
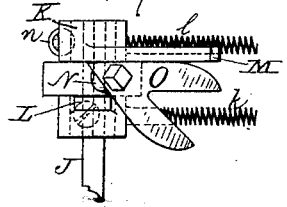
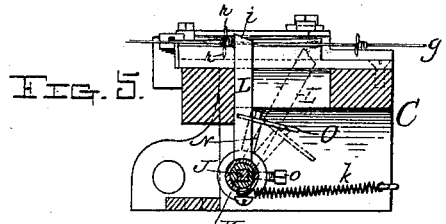
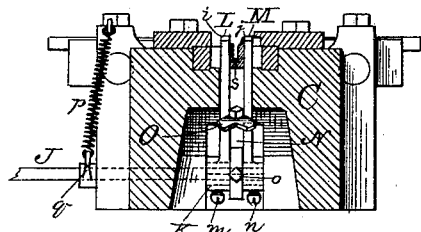
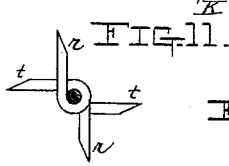
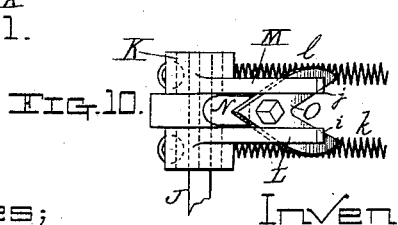
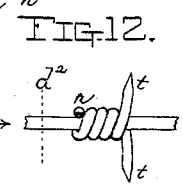
Witnesses:
Joseph A. Toupin
Fred W. Smith
Inventor:
John D. Curtis,
By John C. Dewey, Att'y.

UNITED STATES PATENT OFFICE.

JOHN D. CURTIS, OF WORCESTER, MASS., ASSIGNOR TO THE WASHBURN & MOEN MANUFACTURING COMPANY, OF SAME PLACE.

MACHINE FOR MAKING BARBED FENCING.

SPECIFICATION forming part of Letters Patent No. 340,939, dated April 27, 1886.

Application filed February 17, 1886. Serial No. 192,213. (No model.)

*To all whom it may concern:*

Be it known that I, JOHN D. CURTIS, a citizen of the United States, residing at Worcester, in the county of Worcester and State of Massachusetts, have invented certain new and useful Improvements in Machines for Making Barbed Fencing; and I do hereby declare that the following is a full, clear, and exact description thereof, which, in connection with the drawings making a part of this specification, will enable others skilled in the art to which my invention belongs, to make and use the same.

My invention relates to machines for making barbed fencing, and to the automatic stopping of the machines in case they fail to operate in a proper manner; and my invention consists in certain novel features of construction and operation of the device placed in front of the barbing mechanism and in the path of the barbs, and acted upon by the barbs, said device being connected with means for disconnecting the driving-power and automatically stopping the machine in case it fails to operate in a proper manner.

I have in a previous application, filed December 20, 1884, Serial No. 180,802, fully described, shown, and claimed a device placed in front of the barbing mechanism, and in the path of the barbs, and means for disconnecting the driving power of the machine operated by said device, through intervening mechanism, to automatically stop the machine in case it fails to operate in a proper manner.

My present application relates, therefore, only to a modification of my former device placed in front of the barbing mechanism and in the path of the barbs, the means for disconnecting the driving power of the machine and the intervening mechanism shown and described in this application being the same as set forth in my said first application. I will therefore refer to my previous application for a detail description of the construction and operation of the same.

The device placed in front of the barbing mechanism and in the path of the barbs, shown and described in this application, differs from the device shown in my earlier application above referred to, and I therefore desire to patent the same as a modification thereof.

The device shown and described in this application, placed in front of the barbing mechanism, is designed to be used upon machines for making barbed fencing with four-point barbs—that is, with barbs having four points projecting out in different directions from the main wire or wires of the fence. In this class of barb-fence machines, the wire to form the barbs is usually fed in from each side of the machine and wound upon the main wire or wires by means of a revolving spindle or spindles provided with a coiling finger or fingers, the barb-wires being cut off by means of movable and stationary cutters, so that each barb or group of barbs has four points projecting out in different directions and substantially at right angles to the main fence wire or wires, the two points of each individual barb extending out from each other at an angle of ninety degrees.

By means of my present device placed in front of the barbing mechanism and in the path of the barbs, in connection with the means for disconnecting the driving-power of the machine, described in my earlier application, the machine will be automatically stopped in case one of the individual barbs which form the completed four-point barb fails to be applied to the main wire or wires in a proper manner, notwithstanding the fact that the other individual barb is properly applied, which would be sufficient to operate the device shown in my earlier application, and prevent the machine from being automatically stopped; and this is the difference between my former device and my present device. By means of my present device placed in front of the barbing mechanism a machine making four-point barbed fencing will be automatically stopped in case a four-point barb fails to be applied to the main wire or wires in a proper manner.

It will be readily understood by those skilled in the art that my present device can be used equally well upon machines for making two-point barbed fencing, the points projecting out in opposite directions from the main fence-wire; but it is designed especially to be used upon machines for making four-point barbed fencing.

Referring to the drawings, Figure 1 is a top or plan view of a barbing-machine with my improvements applied thereto. Fig. 2 is a side view of the parts shown in Fig. 1, looking in the direction of the arrow, same figure. Fig. 3 shows, on an enlarged scale, a top or plan view of the cutter-block detached from the machine, and having my improved device applied thereto. Fig. 4 shows an under side of the cutter-block shown in Fig. 3. Fig. 5 shows a central longitudinal section on line $a\,a$, Fig. 3, looking in the direction of arrow $a'$, same figure, showing the main wire after it is barbed, and showing by full and dotted lines the position of the device acted on by the barbs before and after the same is moved forward. Fig. 6 is a cross-section on line $b\,b$, Fig. 3, looking in the direction of arrow $b'$, same figure. Figs. 7, 9, and 10 show, on an enlarged scale, a top or plan view of my device detached from the cutter-block, showing the same in different positions, as will be hereinafter fully described. Fig. 8 is a cross section on line $d$, Fig. 7, looking in the direction of arrow $d'$, same figure; and Figs. 11 and 12 show an end and plan view, respectively, of a full-sized four-point barb, such as is designed to be made upon the machine shown in the drawings. Fig. 11 also shows a cross section taken on line $d^2$, Fig. 12, looking in the direction of the arrow, same figure.

As the manner of construction and operation of the barbing-machine shown in the drawings is old and well known, and as the same forms no part of my present invention, it is not necessary for me to describe the same, my present invention relating simply to the improved device applied to the machine in front of the barbing mechanism and in the path of the barbs.

I will therefore simply state that A is the bed-plate of the machine; B, the coiling-spindle, of any usual and well-known construction and operation, having a finger or lug, $e$, for coiling on the barbs.

C is the cutter-block, provided with stationary and movable cutters, of any usual and well-known construction and operation, for cutting off the barb-wires after the same have been applied to the main wire or wires.

D D are feed-rolls arranged in pairs on each side of the machine, for feeding in the barb-wires $f\,f$, in the usual manner.

E E are feed-rolls arranged at the rear of the machine, to feed in the main wire $g$ upon which the barb-wires are to be coiled.

F is the main shaft, turning in bearings $h\,h$, for operating in the usual manner, through gear-connections, the several parts of the machine.

G is a driving wheel or pulley, loose upon the shaft F, but connected therewith by means of a movable driving-pin, H, entering into a slot in the collar I, secured upon said shaft F and turning therewith. The driving-wheel G is operated by belt-connection or gear-connection with a main driving shaft.

I will now proceed to describe the construction and operation of my improved device, which is applied to the machine in front of the barbing mechanism and directly in the path of the barbs, to be acted upon by the barbs after they have been applied to the main fence-wire.

My device is in this instance located within the cutter-block C, as shown in Figs. 3, 4, 5, and 6 of the drawings. Said device consists of three parts, each of which is made independent of the other; but all act together, and are operated by the barbs moving forward, to prevent the machine from stopping as long as it continues to operate in a proper manner.

Upon one end of a small rocking shaft, J, extending within and having its bearing in the cutter-block C, (see Fig. 6,) is supported and secured a bushing, K, to turn with said shaft J, the end of said shaft being made square in this instance to fit into a square hole in said bushing K, (see Fig. 8;) but the bushing K may be secured to said shaft J by means of a set-screw, or in other equivalent manner, if preferred.

Upon the bushing K are arranged and supported the three parts of my device. The two pivoted or hinged lever-arms L and M, which are not secured to said bushing, but turn loosely thereon, and extend up through a slot in the central part of the cutter-block C, (see Figs. 5 and 6,) are held in an upright position, so that their upper ends, $i$ and $j$, will press against the points of the barbs after the same have been applied to the main fence-wire, (see full lines, Fig. 5,) by means of springs $k$ and $l$, or their equivalents, secured in this instance to lower ends of the levers L and M by screws $m$ and $n$, the other ends of said springs being secured to the cutter-block C. (See Fig. 4.)

The lever-arms L and M are so placed in relation to the barbing mechanism of the machine that their upper ends, $i$ and $j$, are in the path of the barbs after they have been applied to the main fence-wire, and as they are drawn along toward the spooling portion of the machine, so that after the barbs are applied to the main wire in a proper manner the moving along of the barbed wire to be spooled draws over the lever-arms L and M, as shown by dotted lines, Fig. 5, allowing the barbs to pass over their upper ends, said arms being then drawn back into their first position by the springs $k$ and $l$, or their equivalents.

Between the levers L and M there is supported upon the bushing K a third movable lever-arm, N, extending up therefrom about half the length of the levers L and M, and having upon its top end a swivel finger or piece, O, extending out therefrom in front of and in the path of the levers L and M. (See Fig. 6.)

The lever N is secured to the bushing K in this instance by means of a set-screw, $o$, so that the moving forward of the lever N causes the bushing K to revolve, and also the rocking shaft J upon which it is secured. A spring, $p$, secured at one end to the cutter-block C and at the other end to a projecting lug, $q$, secured upon the shaft J, serves to keep the arm N in an upright position, and to draw it back into its first position after it has been drawn forward.

If preferred, the use of the bushing K may be dispensed with and the lever-arms L and M be placed directly on the rocking shaft J, turning loosely thereon, the lever arm N being also placed upon said shaft and secured thereto to move with said shaft.

I have made in the top-side of the cutter-block C suitable slots and grooves for guiding the barbs after they have been applied to the fence-wire, and holding in their proper relative positions the two points of each individual barb. It will be readily understood from Figs. 11 and 12, in connection with Figs. 5 and 6, that in each individual barb having two points, (two individual barbs making a complete barb of four points,) one point, $r$, will extend up or down in the slot $s$, between the ends $i$ and $j$ of the levers L and M, and the other point, $t$, will extend out at an angle of ninety degrees therefrom, so as to project out directly in the path of and strike against the ends $i$ and $j$ of the levers L and M.

The mechanism for disconnecting the driving-power of the machine operated by my improved device is the same as that shown and described in my earlier application, above referred to, and I will therefore simply state here that the rocking shaft J has a crank-arm, P, secured to its outer end, to which is attached a connecting-rod, Q, having a sliding bar, R, attached thereto, which moves in and out in a box or holder, U. The end $u$ of the sliding bar R will strike against the projecting end $v$ of the driving-pin H, and force the same out of contact with the collar I, fast upon the shaft F, and thus disconnect the wheel G from said shaft and automatically stop the machine unless the sliding bar R is drawn out of the box U, so that its end $u$ will not come in contact with the end $v$ of the driving-pin H. It will thus be seen that the moving forward of the lever-arm N, secured upon the bushing K, fast upon the rocking shaft J, will rock said shaft and draw the sliding bar R away from the collar I and away from contact with the driving-pin H, and thus prevent the machine from being stopped.

The operation of my improved device placed in front of the barbing mechanism and in the path of the barbs will be readily understood from the above description, in connection with the drawings.

As long as the machine continues to operate in a proper manner, and a four-point barb is properly applied to the main fence wire or wires, both lever-arms L and M will be drawn forward by the moving barbed wire, causing the lever-arm N to be drawn forward at the same time, (see dotted lines, Fig. 5, also see Fig. 10,) the swivel-piece O being directly in the path of the lever-arms L and M, and causing the shaft J to be rocked, and thus preventing the driving-wheel G from being disconnected from the main shaft F, as above described, and the machine from being stopped.

In case for any reason only one individual barb is applied to the main fence-wire, one end of said barb will project up or down in the slot $s$, between the ends of the lever-arms L and M, and the other end will come in contact with one of said arms, causing said arm to be drawn forward, as shown in Fig. 9, the other arm remaining stationary. The drawing forward of only one arm simply causes the swivel-piece O to be moved over into the position shown in Fig. 9, and does not draw forward the arm N, upon which said piece O is attached. The arm N not being drawn over or moved forward the shaft J is not rocked, and consequently the end of the sliding bar R comes in contact with the driving-pin H, and disconnects the driving-wheel G, and automatically stops the machine.

In case for any reason neither of the individual barbs which make a complete four-point barb is properly applied to the main fence-wire, then neither of the lever-arms L and M will be moved forward, nor will the arm N be moved to rock the shaft J; consequently the machine will be automatically stopped.

It will thus be seen that a machine adapted for making four-point barbed fencing will be automatically stopped by means of my improved device placed in front of the barbing mechanism and in the path of the barbs, in connection with means for disconnecting the driving-power of the machine, if, for any reason, a complete four-point barb fails to be applied to the main fence wire or wires in a proper manner.

The means for disconnecting the driving-power of the machine operated by my improved device forms no part of my present invention, as before stated, which relates only to the device placed in front of the barbing mechanism and in the path of the barbs, and to be acted upon by the barbs, and which is designed especially to be used in machines for making four-point barbed fencing. Any other suitable and equivalent mechanism for disconnecting the driving-power of the machine, and operated by my improved device, may be employed in lieu of that shown and described herein.

The special manner of construction and attachment of the movable lever-arms L and M, and the lever-arm N, provided with a swivel-piece, O, may be varied from that shown and described without departing from the principle of my invention, which consists, essentially, in arranging in front of the barbing mechanism and in the path of the barbs two loose movable lever-arms, or their equivalents, operated by the barb or barbs moving forward, in combination with a third movable lever-arm operated by said two lever-arms having a swivel-piece secured thereto, said third lever-arm being connected with mechanism for disconnecting the driving-power of the machine and automatically stopping the same in case the machine fails to operate in a proper manner.

Having thus described my invention, what I claim as new, and desire to secure by Letters Patent, is—

1. The combination, with two lever-arms loosely hinged or pivoted in front of the barbing mechanism and in the path of the barbs, of a third lever-arm, provided with a swivel-piece projecting out in the path of said lever-arms and acted upon by the same, substantially as set forth, and for the purpose stated.

2. The combination, with a lever-arm provided with a swivel-piece and connected with means for disconnecting the driving-power of the machine, of two lever-arms loosely hinged or pivoted in front of the barbing mechanism and in the part of the barbs, and acted upon by the barbs, moving forward in a proper manner, to draw over said first lever-arm and prevent the machine from being automatically stopped as long as it continues to operate in a proper manner, substantially as set forth.

3. The combination, with lever-arm N, provided with a swivel-piece, O, and secured upon a rocking shaft, J, said shaft being connected with means for disconnecting the driving-power of the machine in case the lever-arm N fails to be moved forward or drawn over, of the two lever-arms L and M, loosely hinged or pivoted in front of the barbing mechanism and in the path of the barbs, and acted upon by the barbs, moving forward in a proper manner, to operate the lever-arm N, and to prevent the machine from being automatically stopped as long as it continues to operate in a proper manner, substantially as set forth.

4. The combination, with rocking shaft J, bushing K, and lever-arm N, secured thereon, and provided with a swivel-piece, O, of the lever-arms L and M, turning loosely on said bushing K, and means for holding said lever-arms in an upright position, so that their upper ends will be in the path of the barbs, to be acted upon by the barbs moving forward after they have been applied to the fence-wire, substantially as set forth, and for the purpose stated.

5. The combination, with the barbing mechanism, of a device placed in front of the barbing mechanism and in the path of the barbs, consisting of two loosely mounted lever-arms, L and M, and a lever-arm, N, provided with a swivel-piece, O, said lever-arm N being connected with means for disconnecting the driving-power and automatically stopping the machine in case it fails to operate in a proper manner, substantially as shown and described.

6. In a machine for making barbed fencing, the combination, with a device placed in front of the barbing mechanism and in the path of the barbs, and consisting of two loosely-mounted hinged or pivoted lever-arms, L and M, and lever-arm N, provided with swivel-piece O, of means for disconnecting the driving-power of the machine and automatically stopping the same in case it fails to operate in a proper manner, substantially as shown and described.

JOHN D. CURTIS.

Witnesses:
JOHN C. DEWEY,
FRED. W. SMITH.